United States Patent [19]

Lindhag

[11] 4,259,885

[45] Apr. 7, 1981

[54] FACING AND JOURNAL TURNING MACHINE

[75] Inventor: Carl L. Lindhag, International Falls, Minn.

[73] Assignee: Boise Cascade Corporation, Boise, Id.

[21] Appl. No.: 53,270

[22] Filed: Jun. 29, 1979

Related U.S. Application Data

[62] Division of Ser. No. 893,429, Apr. 4, 1978, Pat. No. 4,186,630.

[51] Int. Cl.$^3$ .......................... B23B 3/26; B23B 5/04
[52] U.S. Cl. .................................................... 82/4 R
[58] Field of Search .................................. 82/4 R, 4 C

[56] References Cited

U.S. PATENT DOCUMENTS

| 145,103 | 12/1873 | Henderson et al. | 82/4 C |
| 2,211,134 | 8/1940 | Kruell | 82/4 R |
| 3,772,944 | 11/1973 | Becker et al. | 82/4 C |

FOREIGN PATENT DOCUMENTS

465802  9/1951  Italy .......................................... 82/4 R

*Primary Examiner*—Leonidas Vlachos
*Attorney, Agent, or Firm*—Laubscher & Laubscher

[57] ABSTRACT

Portable cutting apparatus is disclosed for turning either the outer peripheral surface of a cylindrical workpiece, such as a journal, or the annular end face of a tubular workpiece, such as the flanged mouth of a retort or the like. A hollow drum, which is rotatably driven around a fixed shaft, carries a change speed gear box for reciprocating a tool holder also carried by the drum. The tool holder is an interchangeable attachment for the drum and depending on the attachment used, the tool is movable in planes either normal to or concentric about the axis of rotation of the drum. The gear box is geared to the fixed shaft and therefore driven by rotation of the drum.

3 Claims, 14 Drawing Figures

FACING AND JOURNAL TURNING MACHINE

This a division of application Ser. No. 893,429, filed Apr. 4, 1978, now U.S Pat. No. 4,186,630.

BRIEF DESCRIPTION OF THE PRIOR ART

Various cutting machines are disclosed in the prior art for facing and similar operations, but most of these are in the nature of attachments for boring mills and the like and therefore useful only in a machine shop. Examples may be found in the prior U.S. Pat. Nos. 3,311,003 to Daugherty and Scholl U.S. Pat. No. 3,744,352. Portable cutting machines for facing pipe and the like are also known as disclosed, for example, in the U.S. patent to Kellum et al U.S. Pat. No. 3,835,738. In none of these patents and in no prior art known to applicant is there disclosed or suggested a portable cutting machine with the capability of facing, boring and external journal turning operations on a wide range of sizes of workpieces.

SUMMARY OF THE INVENTION

The present invention relates to a relatively compact, preferably air driven, portable cutting machine which may be attached to a workpiece in the field. A rotatably driven hollow drum carries a replaceable tool slide for reciprocation in a plane either perpendicular to or concentric with the drum axis. The drum is journalled on a fixed shaft rigidly attached to a base plate which together with a spider plate or journal plate is mounted to a workpiece in the field. With one form of tool support attached to the drum, the machine can face a flange on a pipe or pressure vessel. With a different tool support, the capability is extended to turning, for example, the external surface of either a plain or tapered journal.

A change speed gear box also carried by the drum has its input shaft geared to the stationary shaft and is therefore driven in response to rotation of the drum about the fixed shaft. The output shaft of the gear bos drives the tool slide.

Accordingly, a primary object of the present invention is to provide an improved portable facing and journal turning apparatus including a stationary base plate adapted for connection with an end portion of the workpiece, said base plate extending generally normal to the longitudinal axis of the workpiece, a stationary shaft connected at one end with and extending normal to said base plate, a hollow drum rotatably mounted concentrically about said shaft, a stationary cover member connected with the other end of said shaft for closing the adjacent end of the drum, a tool holder carrying a cutting tool, guide means connecting said tool holder for reciprocation relative to said drum in a direction effecting displacement of the cutting tool along a line parallel with the workpiece surface that is to be machined, drive means for rotating said drum around the shaft, and means responsive to the rotation of the drum about the shaft for linearly displacing said tool holder relative to the guide means.

According to a more specific object of the invention, the means for rotatably driving the drum includes a ring gear connected with said drum concentrically about said shaft, a drive pinion rotatably connected with said cover member, said drive pinion being in meshing engagement with said ring gear, and drive motor means mounted on said cover member for driving said drive pinion. Preferably the drive motor means is an air motor, although electric motor means or the like could be used, if desired.

According to another object of the invention, the means for linearly displacing the tool holder relative to the guide means includes a stationary conical drive gear concentrically mounted on and secured to said shaft, a conical driven pinion gear rotatably connected with said drum and extending normal to the axis thereof, said driven pinion being in meshing engagement with said conical drive gear, a worm gear rotatably connected with said drum, means connecting said worm gear with said conical driven pinion gear, and means driven by said worm gear for linearly displacing said tool holder relative to said drive means.

In a first embodiment of the invention, the guide means are arranged in a plane normal to the axis of rotation of the drum, whereby the turning tool may machine the end surface of a tubular workpiece. In a second embodiment, the guide means are arranged generally parallel with and spaced from the axis of rotation of the drum, whereby the turning tool may machine the outer peripheral surface of a cylindrical object, such as a journal. In order to permit the machining of a tapered cylindrical surface, the guide means are pivotally connected with the drum for adjustment to a position parallel with the surface of the workpiece that is to be machined.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1:
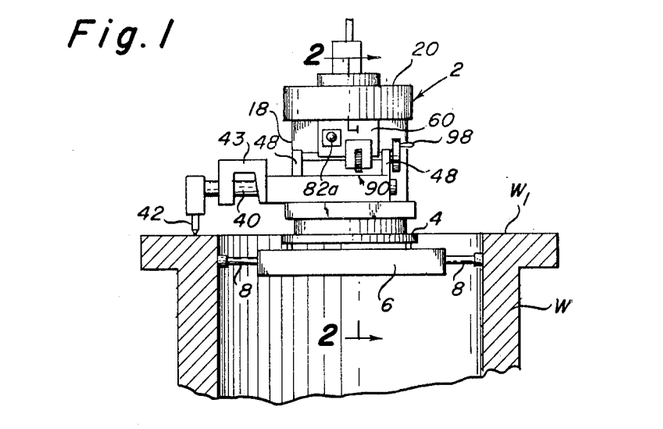
FIG. 1 is a partially sectioned view indicating the manner in which the apparatus of the present invention is mounted for machining the end face of a tubular workpiece.
Figure 2:
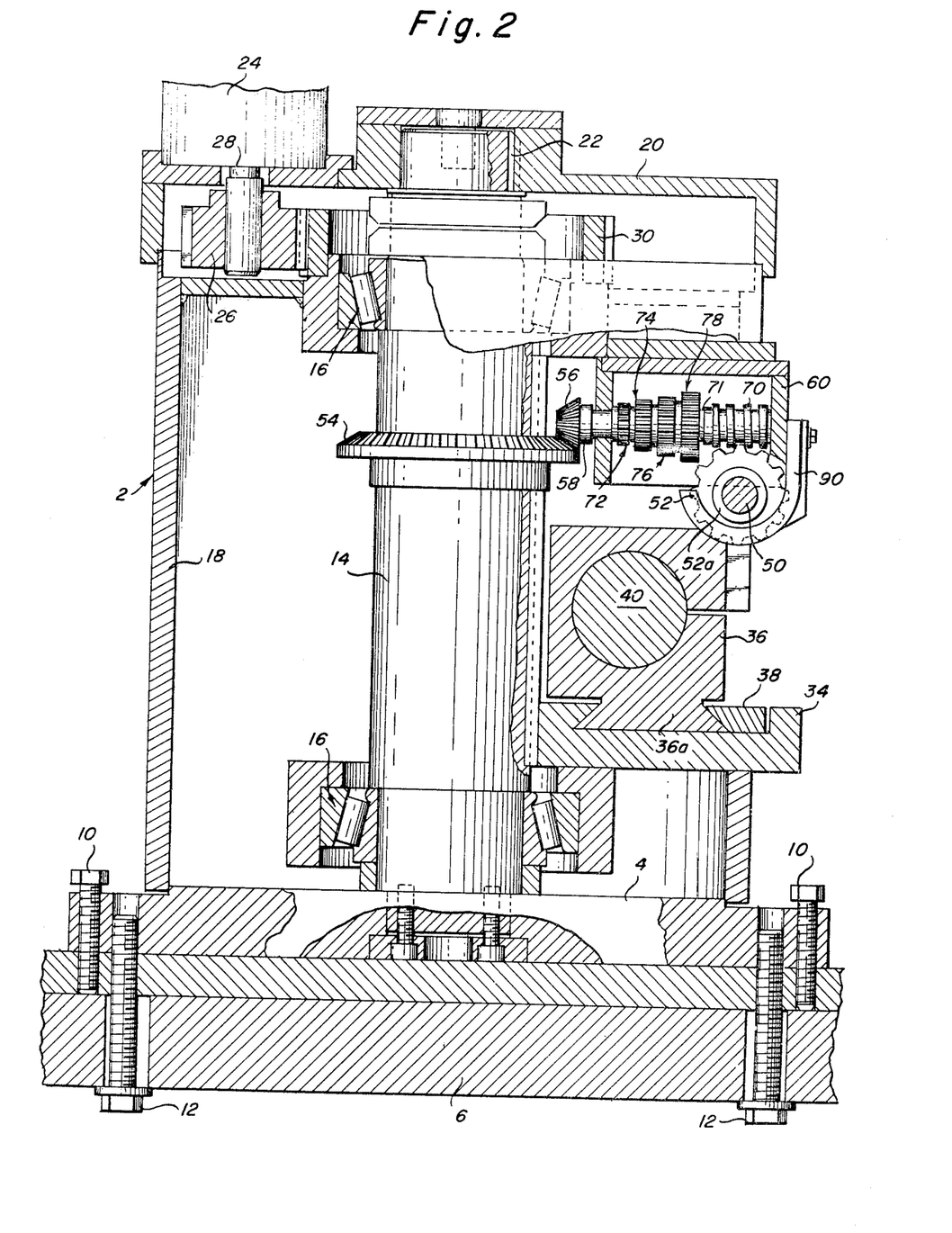
FIG. 2 is a sectional view taken along line 2-2 of FIG. 1.

Referring first more particularly to the embodiment of FIGS. 1-7, the rotary turning apparatus 2 includes a stationary base plate 4 which, as shown in FIG. 1, is adapted to be mounted within the throat portion of a workpiece W by spider mounting means 6. Thus, the spider means 6 includes radial arms 8 that are axially adjustable to center the vertical axis of rotation of the turning apparatus 2 to a position colinear with the vertical longitudinal axis of the workpiece W. The turning apparatus includes, as shown in FIG. 2, centering bolt means 10 for orienting the vertical axis of the rotary apparatus relative to the spider means 6, and further bolt means 12 for locking the base plate 4 in its properly oriented position. Bolted at its lower end to the base plate 4 is a stationary vertical shaft 14 upon which is rotatably supported by the upper and lower bearing means 16 a hollow drum 18, stationary cover member 20, which is keyed to the upper end of the shaft 14 by key 22, serves to close the upper end of the rotary drum 18.

Driving means are provided for rotatably driving the drum 18, said driving means including a driving motor 24 mounted on the cover member 20, and a drive pinion 26 mounted on the downwardly extending motor shaft 28, which drive pinion is in meshing engagement with a ring gear 30 that is secured to the drum concentrically about the stationary shaft 14.

Figure 3:
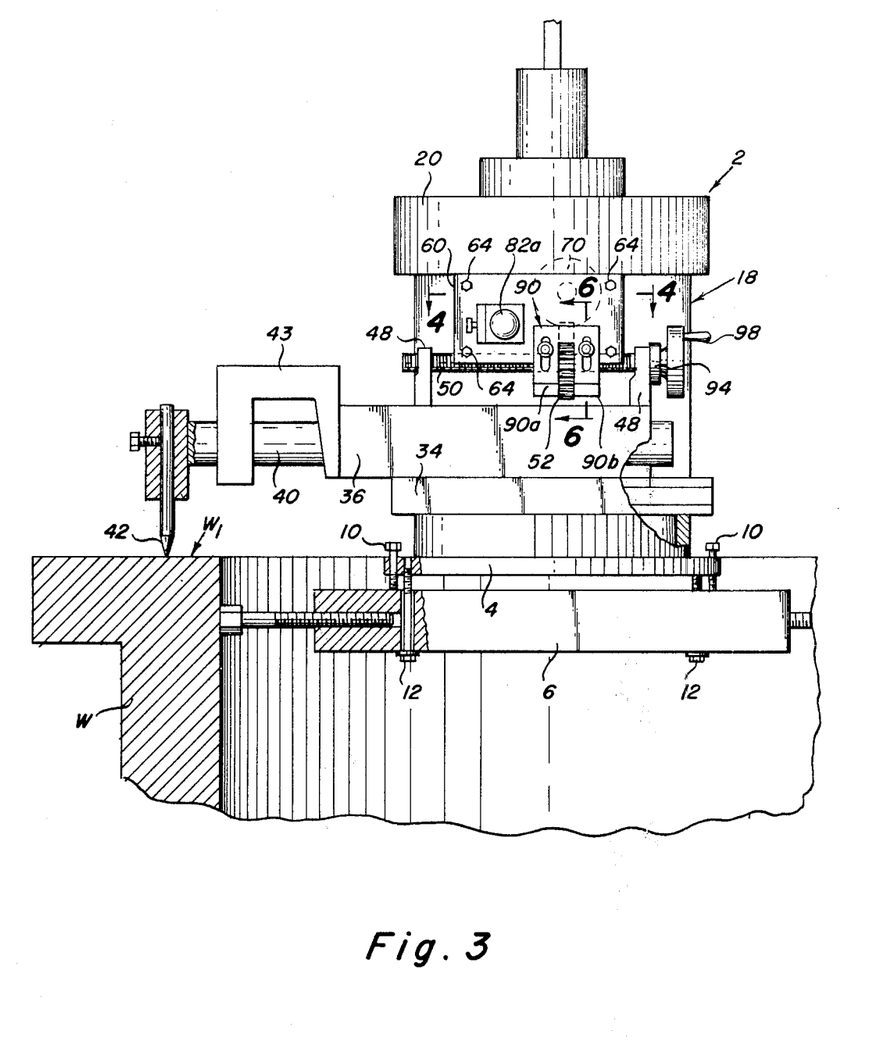
FIG. 3 is a detailed side elevational view, with certain parts partially broken away, of the apparatus of FIG. 1.

In accordance with the present invention, guide means 34 are provided for guiding a tool holder 36 for reciprocatory movement along an axis contained in a plane normal to the vertical shaft 4. Thus, in the illustrated embodiment, the guide means are of the wedge and groove type including a wedge insert 38 for retaining the lower wedge shaped portion 36a of the tool holder in the corresponding groove contained in the guide means 34. Mounted in the tool holder 36 is a work holder shaft 40 to which is secured at its other end a cutting tool 42. The tool holder means may include a stabilizing bridge portion 43 which, as shown in FIG. 3, is connected at its right hand end with the tool holder 36, and supports at its other end the tool holder shaft 40. Rotatably mounted on the tool holder 36 by means of the spaced bearings 48 is a threaded drive shaft 50 which extends parallel with the axis of the guide means 34. Threadably mounted on the drive screw 50 is a worm pinion 52.

Figure 4:
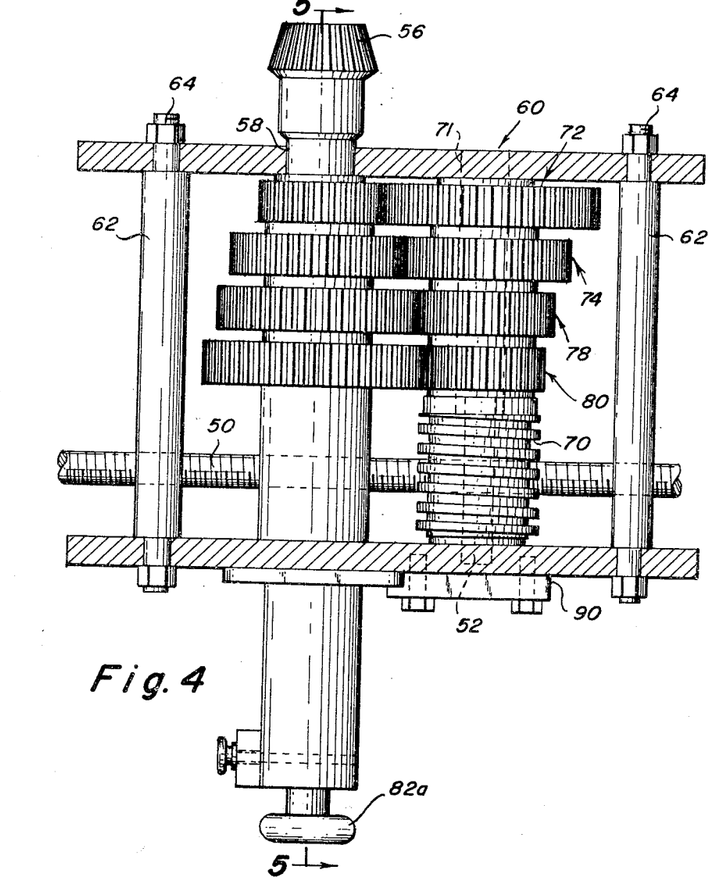
FIG. 4 is a sectional view taken along line 4—4 of FIG. 3.
Figure 5:
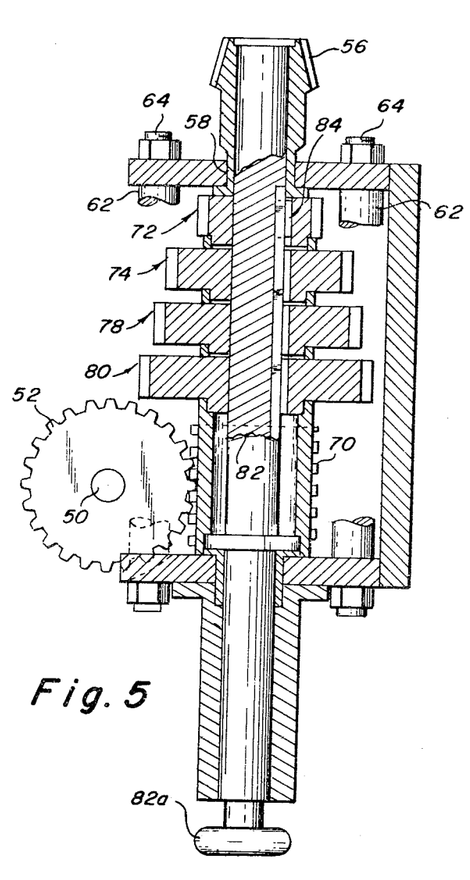
FIG. 5 is a sectional view taken along line 5—5 of FIG. 4.
Figure 6:
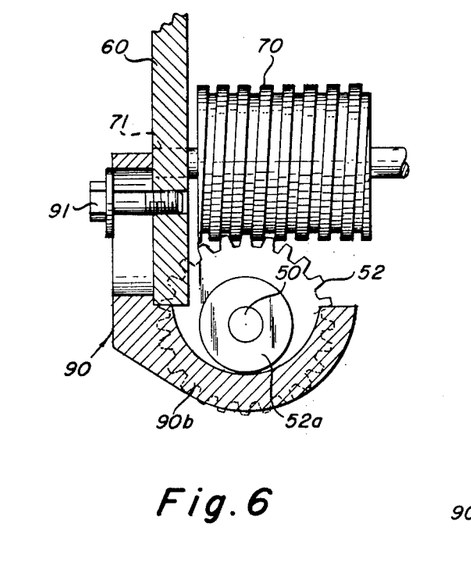
FIG. 6 is a sectional view taken along line 6—6 of FIG. 3.
Figure 7:
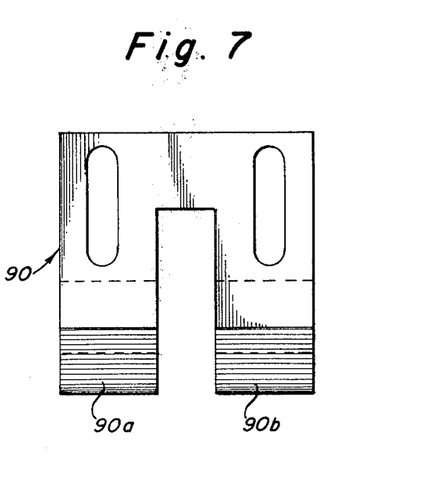
FIG. 7 is a front elevational view of the worm support member of FIG. 6.

Referring again to FIG. 2, in order to effect linear displacement of the tool holder means relative to the guide means 34, a conical drive gear 54 is arranged concentrically about and is secured to the vertical shaft 14, said conical drive gear being in meshing engagement with the corresponding conical pinion 56 that is connected with a shaft 58 that is journaled in change speed gearing housing 60 that is rigidly secured to the drum 18. Thus, as shown in FIGS. 2 and 4, the housing 60 has a generally U-shaped cross section which is opened at its bottom and side ends, the opposed front and rear walls of the housing being stabilized by spacer sleeves 62 and through bolts 64. The conical pinion gear 56 is connected with a worm gear 70 that is mounted on a shaft that is parallel with shaft 58 and is also journaled between the front and rear walls of the housing 60. More particularly, a speed-changing gearing arrangement is provided including cooperating pairs of enmeshing gears 72, 74, 78, and 80 that are secured to the shafts 58 and 71, respectively. The cooperating pairs of chain speed gears 72, 74, 78, and 80 have different gear ratios as selected by the axially displaceable speed changing shaft 82 which is selectively connected to the cooperating pairs of gears by means of a key member 84. The worm gear 70 is in enmeshing engagement with the worm pinion 52 that is in turn threadably mounted on the drive screw 50. Mounted on the forward wall of the housing 60 is a support member 90 which is provided at its lower end with a pair of spaced generally U-shaped support arms 90a and 90b that straddle the worm pinion 52 and rotatably support the collar portion 52a thereof as shown in FIGS. 2 and 6. Thus, upon rotation of the drum 18 about vertical shaft 14, conical pinion 56 is rotated by conical drive gear 54, worm gear 70 is rotatably driven by the selected pair of change speed gears, and worm pinion 52 is rotated relative to the drive screw 50. In order to restrain rotation of the drive screw 50 relative to its bearing supports 48, friction applying means 94 (FIG. 3) are provided which restrict rotation of the drive screw 50 relative to the bearings 48, whereupon worm pinion 52, which is rotated by the worm gear 70, is displaced axially of the drive screw 50. Since the worm gear 52 is restrained against axial displacement by the U-shaped worm gear support member 90, drive screw 50 and the tool holder 36 are linearly displaced relative to guide means 34. Consequently, tool holder 36 and shaft 40 are linearly displaced to progressively displace the cutting tool 42 radially outwardly of the workpiece end face $W_1$ during continued rotation of the drum 18 as shown in FIG. 3. In the event that it is desired to axially shift the tool holder 36 and rod 40 relative to the guide means 34 when the drum 18 is stationary, the drive screw 50 is manually rotated by the operating handle 98 secured to the right hand extremity thereof. Thus, the frictional component applied to drive screw 50 by the friction applying means 94 is overcome by manual operation of the operating handle 98. Consequently, the manually operable handle 98 may be utilized to return the tool holder 36, the shaft 40, and the cutting tool 42 toward its initial machining position relative to the end face $W_1$ of the workpiece W.

It is apparent that on removal of the retaining member 38 of FIG. 2 from the guide means 34, and the removal of the worm gear support member 90 from the housing 60 by removal of the bolts 91, the tool holder 36, drive screw 50, tool holder rod 40 and cutting tool 42 may be removed from the guide means 34, and the base plate 4 may be disconnected from the spider means 6.

Figure 8:
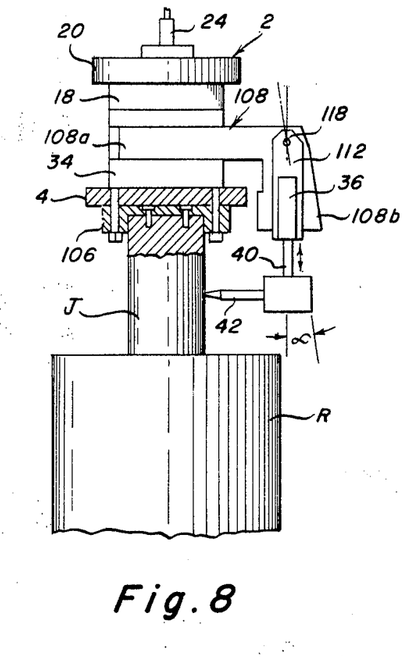
FIG. 8 is a diagrammatic view of a second embodiment of the invention adapted for machining the outer peripheral surface of a cylindrical object, such as a journal.
Figure 9:
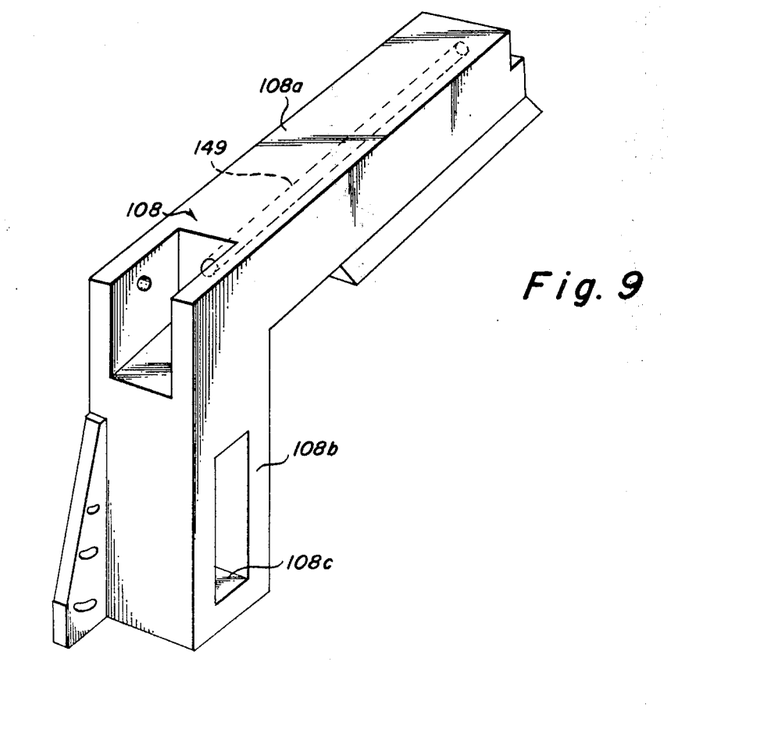
FIG. 9 is a rear perspective view of the L-shaped adaptor member included in the apparatus of FIG. 8.

Referring now to FIG. 8, in order to use the turning apparatus of the present invention for machining the outer peripheral surface of a cylindrical work piece (such as the journal J of a large roll R), the base plate 4 is bolted to a mounting member 106 that in turn is bolted to the end face of the journal J.

In this embodiment, one arm 108a of an L-shaped adaptor member 108 is slidably connected in the guide means 34, said L-shaped adaptor member including a second arm portion 108b that extends downwardly adjacent the outer peripheral surface of the journal J. The tool holder 36 of FIGS. 1 and 3 is slidably connected with a second guide plate 112 that is pivotally connected at its upper end by pivot pin 118 with the junction between the arm portions 108a and 108b of adaptor member 108. Tool holder rod 40 and the cutting tool 42 are carried by the tool holder 36.

Figure 10:
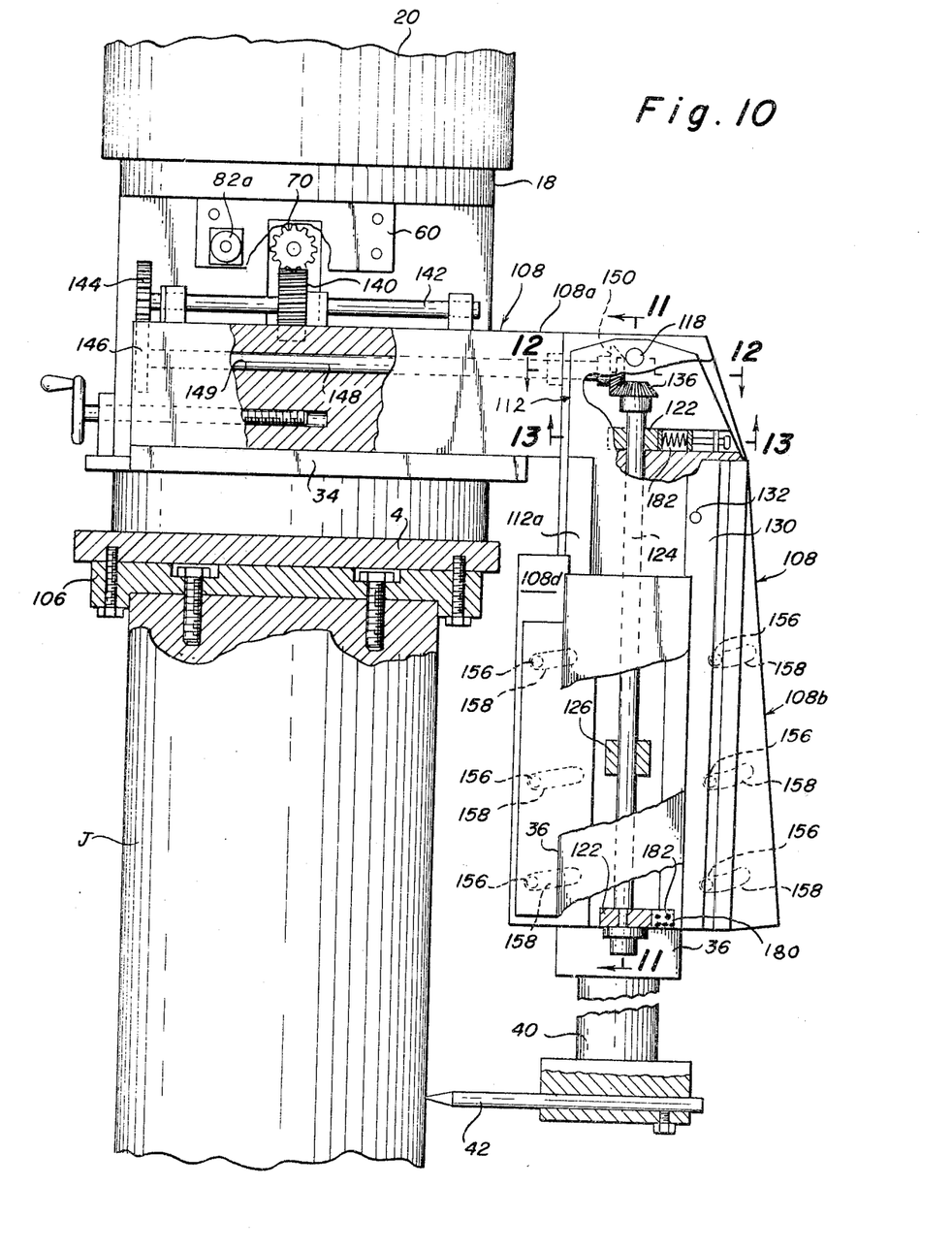
FIG. 10 is a detailed elevational view of the apparatus of FIG. 8.
Figure 11:
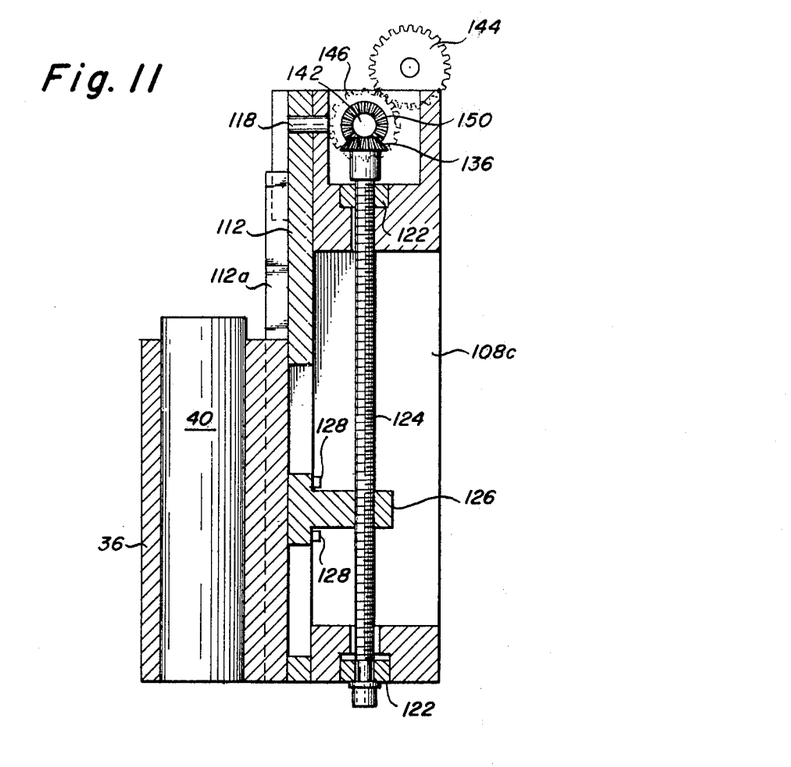
FIGS. 11, 12 and 13 are sectional views taken along lines 11—11, 12—12 and 13—13, respectively of FIG. 10.
Figure 12:
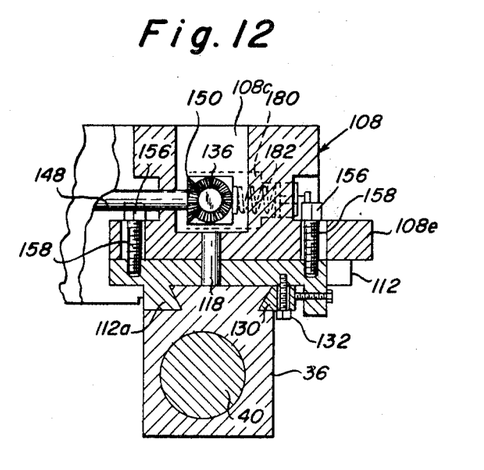
Figure 13:
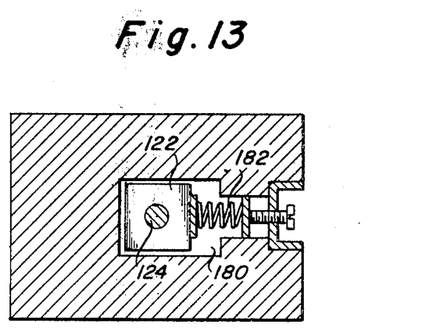

Rotatably mounted at opposite ends in bearings 122 mounted at the upper and lower ends of a vertical through passage 108c contained in the second arm 108b is a drive screw 124 upon which is threadably mounted the nut member 126 which in turn is bolted to the tool holder 36 by bolts 128 as shown in FIG. 11. Thus, the drive screw 124 is arranged parallel with the guide means 112a guide plate 112. As shown in FIG. 12, guide means include a removable jib member 130 that is bolted to the guide plate 112 by bolts 132. Secured to the upper end of the drive screw 124 is a conical pinion gear 136 that is driven by worm gear 70 via worm gear 140 (FIG. 10) secured to shaft 142 that is rotatably connected with the adaptor member 108, the meshing pair of gears 144 and 146, shaft 148 that extends longitudinally through the bore 149 contained in the first arm portion 108a and conical pinion gear 150.

The pivotally connected guide plate 112 is normally fastened to the arm 108b of the adaptor member to cause the guide means 112a and the drive screw 124 to be parallel with the central line of the work piece J. To this end, bolts 156 (FIG. 12) extend through slats 158 contained in the wing portions 108b and 108c that extend from the sides of the second arm portion 108b, the free ends of the bolts 156 being threadably mounted in corresponding threaded bores contained in the rear surface of the guide plate 112.

In operation, when the drum 18 is rotated about the vertical shaft 14, worm gear 70 is rotated to drive the conical pinion 150 which in turn drives the drive screw 124 to linearly displace the tool holder 36 relative to the guide means 112a. Consequently, as the second adaptor arm 108b rotates concentrically about the cylindrical journal J, the cutting tool 118 progressively machines the outer peripheral surface of the journal.

Figure 14:
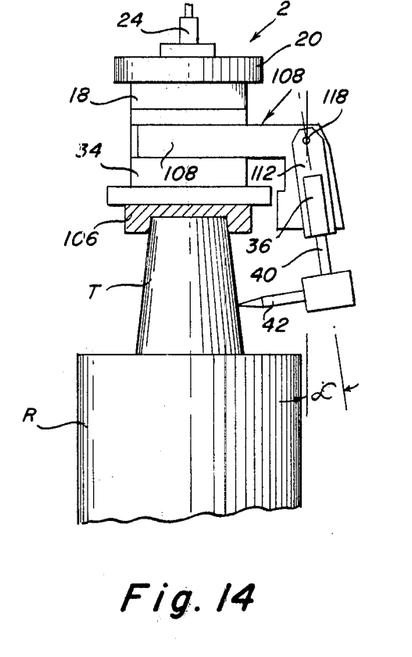
FIG. 14 is a diagrammatic view illustrating the manner of use of the apparatus of FIG. 8 for machining a tapered workpiece.

Referring now to FIG. 14, the apparatus of FIG. 8 is operable to machine the outer peripheral surface of a tapered cylindrical journal. To this end, locking bolts 156 are loosened, and the guide plate 112 is pivoted through the small angle α to a position in which the guide means 112a and the drive screw 124 are parallel with the outer peripheral surface of the tapered journal T. In order to permit this slight angular adjustment of the guide plate 112, the bearings 122 for the drive screw 124 are mounted in oversized recesses 180 contained in the second arm 108b of the adaptor member, the bearings normally being biased by a springs 182 to the left toward the positions illustrated in FIG. 10. When the guide plate 112 has been pivoted in the counter clockwise direction toward the angularly arranged position of FIG. 14, the bolts 156 are again tightened to fasten the guide plate in place. Consequently, during rotation of the drum 18 about its vertical shaft 14, the cutting tool 118 is progressively displaced downwardly for machining substantially the entire surface of the tapered journal T.

It is apparent that in the various embodiments of the invention, the advantage is afforded that the portable apparatus may be transported to relatively inaccessible locations for the machining of large work pieces in situ. Thus, in the illustration of FIG. 1, the work piece W might be the upper end of a large digestor which, in the paper industry, may be on the order of forty feet tall and have an opening with a diameter of approximately two and one-half feet. Consequently, the machine apparatus might be hoisted in place and mounted within the throat portion at the upper end of the digestor for machining the upper end surface $W_1$ thereof. In the embodiments of FIGS. 8 and 14, the machining apparatus might be used for machining the journals of large rolls, which in the paper making industry may have a length of on the order of eighteen feet, which journals are either cylindrical or tapered and may have a length of about two feet. Since the motor means (which is normally a pressure fluid driven motor) is rigidly secured to the upper cover member of the machining apparatus, the apparatus has a compact rugged construction which permits its transport to relatively difficult inaccessible locations.

While in accordance with the provisions of the Patent Statutes, the preferred forms and embodiments of the invention have been illustrated and described, it will be apparent to those skilled in the art that various changes and modifications may be made without deviating from the inventive concepts set forth above.

What is claimed is:
1. Portable turning apparatus for machining the peripheral surface of a generally cylindrical workpiece, comprising
   (a) a stationary base plate (6) adapted for connection with an end portion of the workpiece, said base plate extending generally normal to the longitudinal axis of said workpiece;
   (b) a stationary shaft (14) normal to and connected at one end with said base plate, said shaft being generally colinear with the workpiece longitudinal axis;
   (c) a hollow drum (2) journalled for rotation concentrically about said shaft;
   (d) a cover member (20) connected with the other end of said shaft for closing the end of said drum adjacent thereto;
   (e) cutting means including a tool holder (40), and a cutting tool (42) carried by said tool holder;
   (f) guide means connecting said tool holder for reciprocation relative to said drum in a direction generally parallel with and spaced from the axis of rotation of said drum;
   (g) drive means (24) for rotating said drum about said shaft; and
   (h) means responsive to the rotation of said drum about said shaft for linearly displacing said tool holder relative to said guide means, whereby when the base plate is mounted on the end surface of a cylindrical workpiece, the tool holder is rotated about the workpiece and is linearly displaced to effect machining of the outer peripheral cylindrical surface of the workpiece by the cutting tool, said means for linearly displacing said tool holder relative to said guide means comprising
      (1) an L-shaped support member (108) having a first arm (108a) portion connected with said drum and being contained in a plane normal to the axis thereof, said support member having a second arm portion (108b) which extends generally parallel with the axis of said drum, said second arm portion being adapted to extend adjacent the outer peripheral cylindrical surface of the workpiece;
      (2) means mounting said guide means on, and extending generally parallel with, said second arm portion, said mounting means including a mounting plate pivotally connected at one end with said L-shaped support member adjacent the juncture between said first and second arm portions for pivotal movement about a pivot axis normal to said support member, thereby to permit said mounting plate and said guide means to be pivoted to an angularly arranged position in which the axis of said guide means is inclined at a small angle relative to a line passing through said pivot axis parallel with the axis of rotation of said drum, and means for fastening said mount- ing plate in said angularly arranged position relative to said second arm portion;

(3) a drive screw (124) rotatably connected with, and extending generally parallel with, said second arm portion;

(4) means (126) threadably connecting said tool holder with said drive screw; and (5) means responsive to the rotation of said drum relative to said shaft for driving said drive screw, whereby said cutting tool is operable to machine the outer peripheral surface of a tapered workpiece.

2. Apparatus as defined in claim 1, wherein said drum drive means includes:

(1) a ring gear connected with said drum concentrically about said shaft;

(2) a drive pinion rotatably connected with said cover member, said drive pinion being in meshing engagement with said ring gear;

(3) drive motor means mounted on said cover member for driving said drive pinion.

3. Apparatus as defined in claim 2, wherein said means for driving said drive screw in response to rotation of said drum relative to said shaft comprises (1) a stationary conical drive gear concentrically mounted on and secured to said shaft;

(2) a conical driven pinion gear rotatably connected with said drum and extending normal to the axis thereof, said driven pinion being in meshing engagement with said conical drive gear;

(3) a worm gear rotatably connected with said drum;

(4) means connecting said worm gear with said conical driven pinion gear; and (5) means driven by said worm gear for driving said drive screw.

* * * * *